United States Patent [19]

Heimerdinger

[11] Patent Number: 5,753,271
[45] Date of Patent: May 19, 1998

[54] HEAT BLANKET BUFFER ASSEMBLY

[75] Inventor: Maro W. Heimerdinger, Torrance, Calif.

[73] Assignee: Northrop Grumman Corporation, Los Angeles, Calif.

[21] Appl. No.: 516,350

[22] Filed: Aug. 18, 1995

[51] Int. Cl.$^6$ .............................. B29C 73/34; B32B 35/00
[52] U.S. Cl. ........................ 425/11; 29/402.11; 156/94; 156/98; 264/36
[58] Field of Search ..................... 156/94, 98, 285; 264/36; 425/11; 29/402.01, 402.09, 402.11

[56] References Cited

U.S. PATENT DOCUMENTS

| | | | |
|---|---|---|---|
| 4,560,428 | 12/1985 | Sherrick | 156/94 |
| 4,567,076 | 1/1986 | Therrien . | |
| 4,767,656 | 8/1988 | Chee et al. . | |
| 4,793,879 | 12/1988 | Mimbs | 156/94 |
| 4,808,253 | 2/1989 | Mimbs | 156/98 |
| 4,888,247 | 12/1989 | Zweben | 428/105 |
| 4,961,799 | 10/1990 | Cologna et al. . | |
| 4,978,404 | 12/1990 | Westerman, Jr. . | |
| 5,023,987 | 6/1991 | Wuepper | 156/98 |
| 5,050,595 | 9/1991 | Krafft | 450/38 |
| 5,260,124 | 11/1993 | Gaier . | |
| 5,316,080 | 5/1994 | Banks et al. | 165/185 |
| 5,442,156 | 8/1995 | Westerman | 156/285 |

*Primary Examiner*—Daniel Stemmer
*Attorney, Agent, or Firm*—Terry J. Anderson; Karl J. Hoch, Jr.

[57] ABSTRACT

An apparatus and method is disclosed using a graphite fiber blanket (20) of high thermal conductivity to repair an aircraft structure (10) made of composite fiber materials. The graphite fiber blanket (20) is placed in thermal contact with a silicone rubber heat blanket (22), with an internal heat source, and the aircraft structure, such as composite laminates (12, 14). Use of the graphite fiber blanket (20) increases the rate at which the temperature of the laminates can be elevated to the proper range for repair and transfers heat from hot spots to cold spots to ensure a uniform temperature throughout the laminates.

8 Claims, 3 Drawing Sheets

HEAT BLANKET BUFFER ASSEMBLY

TECHNICAL FIELD OF THE INVENTION

This invention relates to the repair of aircraft structures made of composite laminates.

BACKGROUND OF THE INVENTION

Aircraft structure formed of carbon fiber composite laminates are becoming more common, particularly in high performance military aircraft. These materials replace the traditional materials, such as aluminum, from which aircraft structures have traditionally been made.

One of the advantages of the use of carbon fiber materials is the ease of repair should the aircraft structure become damaged, as by an accident such as a tool or the like damaging the surface or even combat related damage. The repair can be performed by providing sufficient bonding resins and carbon fiber material to the place of repair and bonding the carbon fibers with heat to cure the bonding materials.

In performing such repairs, it is desirable to maintain the temperature of the aircraft structure being repaired at a precise, and uniform temperature consistent with the curing requirements of the bonding material. In the past, it has been common to use a silicone rubber heat blanket with heater wires distributed therethrough to heat the aircraft structure to a desired temperature. However, because of integral heat sinks and nonuniform structure in the aircraft assemblies, it has been difficult to achieve a uniform temperature distribution. A need exists for an apparatus and method to provide a more uniform heat distribution to provide a uniform temperature for the repair.

SUMMARY OF THE INVENTION

In accordance with one aspect of the present invention, an apparatus is provided for repairing an aircraft structure which is repairable with the use of heat. The apparatus includes a heat source and a graphite fiber element in thermal contact with the heat source and the aircraft structure. The graphite fiber element ensures a uniform temperature at the aircraft structure for repair. In accordance with another aspect of the present invention, a silicone rubber heat blanket is provided in thermal contact with the graphite fiber element.

In accordance with another aspect of the present invention, a method is provided for repairing an aircraft structure which is repairable with the use of heat, including the step of placing a graphite fiber element in thermal contact with the aircraft structure to be repaired and placing a heat source in thermal contact with the graphite fiber element. The method further includes a step of heating the aircraft structure with heat from the heat source distributed uniformly by the graphite fiber element to provide a uniform temperature in the aircraft structure for repair. A further aspect of the method is the placement of a silicone rubber heat blanket in thermal contact with the graphite fiber element.

BRIEF DESCRIPTION OF THE DRAWINGS

For a more complete understanding of the present invention and the advantages thereof, reference is now made to the following description, taken in conjunction with the accompanying drawings, in which.

DETAILED DESCRIPTION

With reference now to the accompanying figures and the following detailed description, an apparatus and method for uniformly heating an aircraft structure 10 to provide a uniform temperature in this structure for repairing the structure is disclosed.

Figure 1:
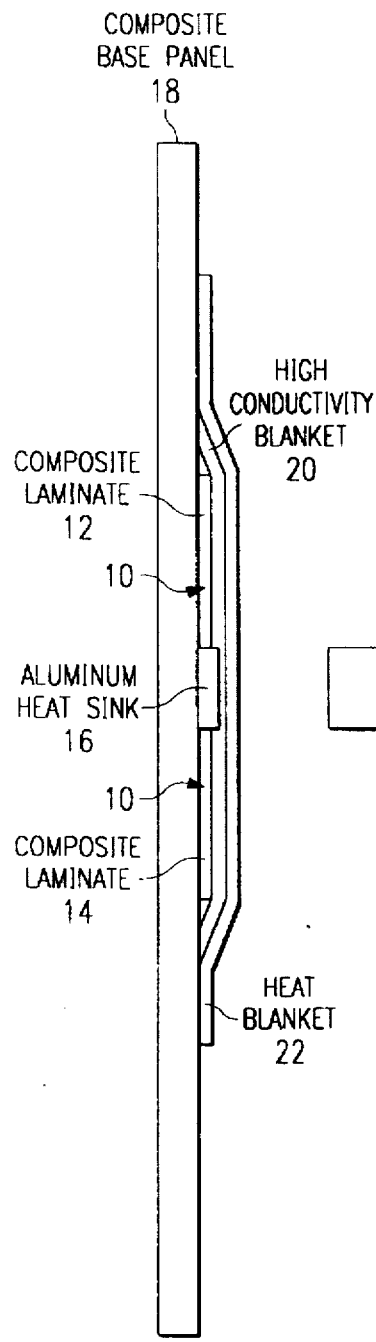
FIG. 1 is a side cross-sectional view of an apparatus constructed in accordance with the teachings of the present invention used to uniformly heat an aircraft structure.
Figure 2:
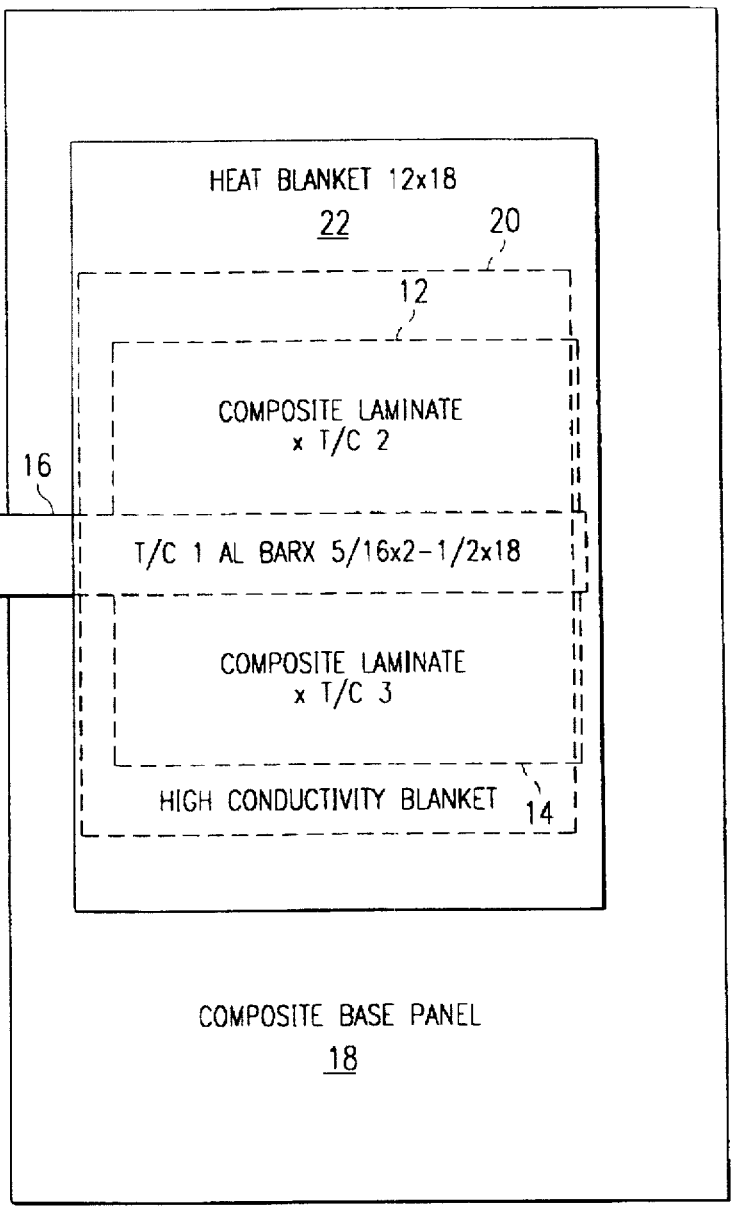
FIG. 2 is a plan view of the apparatus.

In FIGS. 1 and 2, the aircraft structure 10 includes a left hand composite laminate 12 and a right hand composite laminate 14 separated by an aluminum heat sink 16. The laminates 12 and 14 and heat sink 16 rest on a composite base panel 18. However, it will be understood that the present invention need not use a heat sink 16 and the laminate or laminates being repaired can be of any configuration.

Lying atop the laminates 12 and 14 and heat sink 16 is a graphite fiber blanket 20 having highly conductive pitch graphite fibers. Lying atop the blanket 20 is a silicone rubber heat blanket 22. Blanket 22 is of the type commonly known in the industry that contains heater wires therein through which current can pass to provide heat to perform a repair on the laminates 12 and 14.

Figure 3:
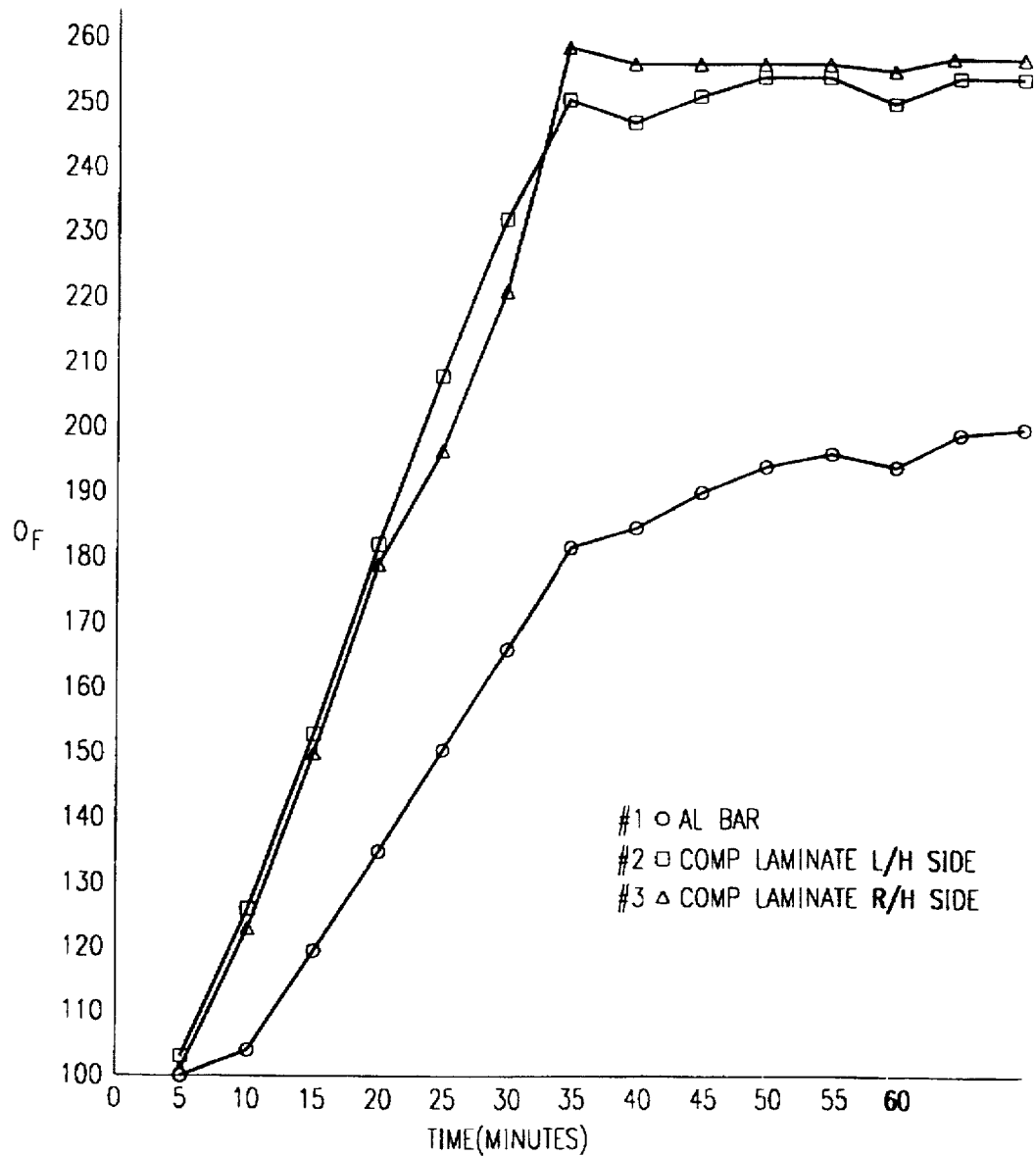
FIG. 3 is a graph illustrating the temperature distribution in an aircraft structure using a prior art apparatus.
Figure 4:
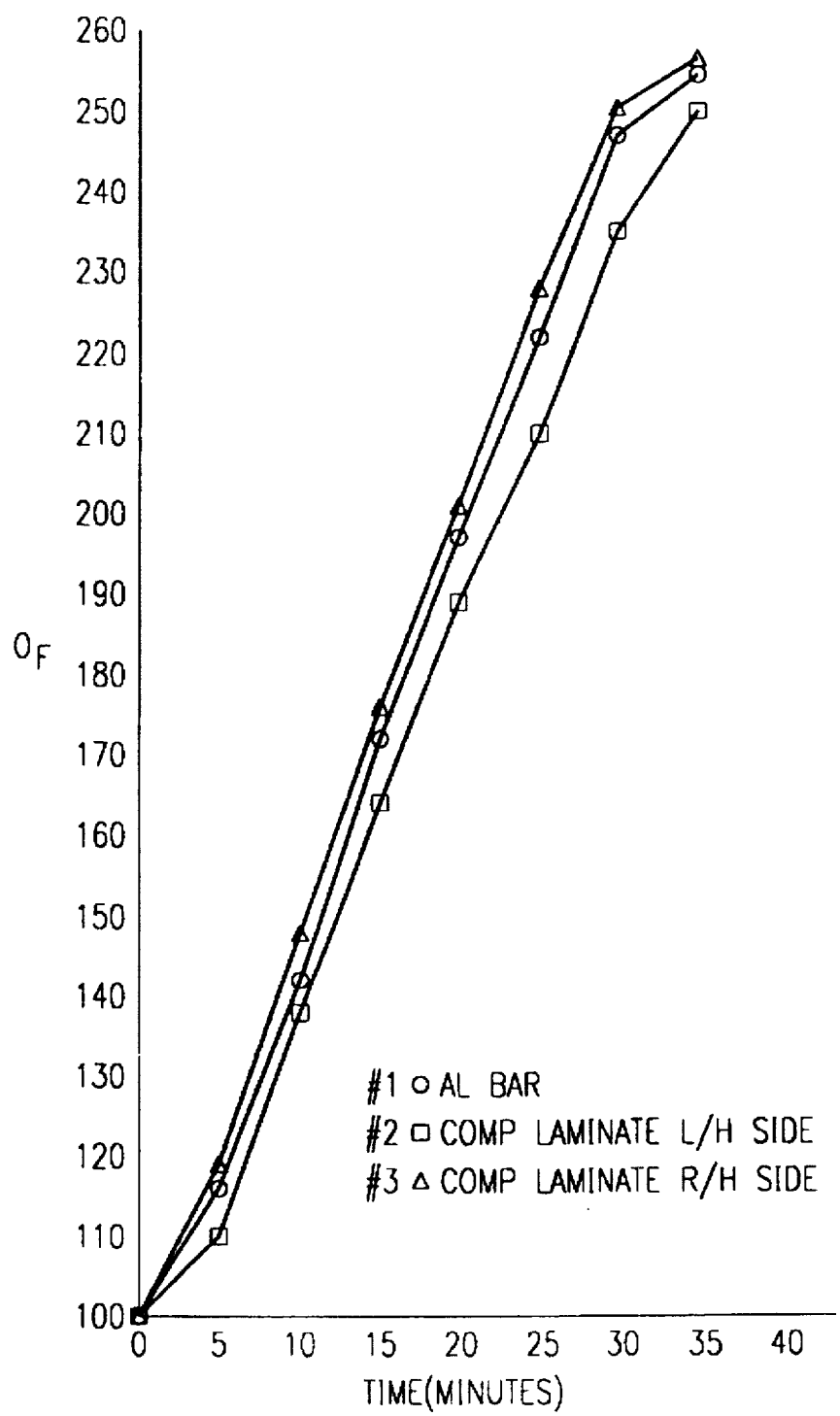
FIG. 4 is a graph of the temperature distribution in an aircraft structure with the present invention.

In the absence of the graphite fiber blanket 20, as the laminates 12 and 14 are heated by the heat blanket 22, the temperature distribution in the laminates and aluminum heat sink will vary considerably with time, as seen in FIG. 3. However, by use of the graphite fiber blanket 20, the temperature distribution between the aluminum bar heat sink 16 and the laminates 12 and 14 and within the laminates is much more uniform, as seen in FIG. 4, providing a much more uniform temperature throughout the laminates. In addition, the temperature rise of the entire aircraft structure is much quicker, providing for a faster and more uniform bonding of the repair material to the aircraft structure. The graphite fiber blanket transfers heat from hot spots to cold spots and assists in maintaining uniform temperature with resulting improved repair patch integrity.

The graphite fiber blanket 20 utilized is formed of the type of material discussed in U.S. Pat. No. 5,316,080, which patent is incorporated herein by reference in its entirety, which has a very high thermal conductivity, exceeding even that of copper. The thermal conductivity of the fibers can be, for example, about three times that of copper.

One graphite fiber blanket 20 found usable in the process of the present invention is manufactured by AMOCO Performance Products, Inc. as Thermalgraph™fabric under the trademark Thornel®. Both the Thermalgraph™fabric EWC-300X and the Thermalgraph fabric EWC-500X have been found suitable. The test illustrated in FIG. 4 was with EWC-300X fabric. These materials are pitch fiber based high thermal conductivity woven fabrics. Due to the orthotropic nature of the weave and the high longitudinal thermal conductivity of the fibers, biaxial thermal conductivity is achieved. The EWC-300X is a plain weave fabric constructed from four-thousand filament continuous pitch tows. EWC-500X is available as an eight harness satin weave fabric constructed from two-thousand filament continuous pitch tows. The EWC-300X material has a count (warp and fill) of 11×10 tows per inch and a weight of 599 g per square meter. The fabric electrical resistivity (warp and fill) is 0.05 $\Omega$/sq. The density is 2.1 g per cubic centimeter and the yarn electrical resistivity is 4.0–5.0 micro ohm meters. The estimated thermal conductivity is 200–300 W/m°K. The EWC-500X material has a count (warp and fill) of 20×20 tows per inch and a weight of 485 g per square meter. The thickness is 0.61 mm and the resistivity is 0.03 Ω/sq. The density is 2.15 g per cubic meter and the yarn electrical resistivity is 2.3 to 2.8 micro ohm meters. The estimated thermal conductivity is 400–500 W/m°K.

In the preferred embodiment, a three-ply graphite fiber blanket 20 is formed composed of three plies of the EWC-300X material stitched together.

In the assembly illustrated in FIGS. 1 and 2, the silicone rubber heat blanket 22 is a rectangle of 12 inches by 18 inches. The aluminum heat sink is a bar 5/16 inch thick by 2½ inches wide by 18 inches long.

Although a single embodiment of the invention has been illustrated and described with numerous specific details in the forgoing description and accompanying drawings, it will be understood that the invention is not limited to the embodiment disclosed, but is capable of numerous rearrangements, modifications and substitutions of parts and elements without department from the spirit and scope of the invention.

I claim:

1. An apparatus for repairing an aircraft structure repairable with the use of heat, comprising:
    a heat source;
    a graphite fiber element in thermal contact with the heat source and the aircraft structure, the graphite fiber element ensuring a uniform temperature in the aircraft structure for repair, said graphite fiber element being woven the heat source including a silicone rubber heat blanket in thermal contact with the graphite fiber element.

2. The apparatus of claim 1, wherein the graphite fiber element has a thermal conductivity of between about 200–500 W/m°K.

3. The apparatus of claim 1, further comprising a metal heat sink in thermal contact with the aircraft structure and the graphite fiber element.

4. The apparatus of claim 1 wherein the graphite fiber element is three-ply.

5. The apparatus of claim 1 wherein the graphite fiber element is not bonded.

6. A method for repairing an aircraft structure repairable with the use of heat comprising the steps of:
    placing a woven graphite fiber element in thermal contact with the aircraft structure to be repaired;
    placing a heat source in thermal contact with the graphite fiber element and heating the graphite fiber element and aircraft structure with the heat source, the graphic fiber element transferring heat into the aircraft structure to ensure a uniform temperature in the aircraft structure for repair;
    the step of placing a heat source on a graphite fiber element including the step of placing a silicone rubber heat blanket with internal heating elements in thermal contact with the graphite fiber element.

7. The method of claim 6 further comprising the step of heating the aircraft structure to a temperature range of 250–350 degrees Fahrenheit.

8. The method of claim 6 wherein the graphite fiber element is three ply.

* * * * *